(12) United States Patent
Carlo et al.

(10) Patent No.: US 6,233,875 B1
(45) Date of Patent: *May 22, 2001

(54) SEALED MODULE FOR A VEHICLE DOOR

(75) Inventors: Bertolini Carlo, Feucherolles; Arquevaux Laurent, Sully sur Loire, both of (FR)

(73) Assignee: Meritor Light Vehicle Systems - France (FR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/056,907

(22) Filed: Apr. 8, 1998

(30) Foreign Application Priority Data

Apr. 16, 1997 (FR) .................................................. 97 04694

(51) Int. Cl.$^7$ .................................. B60J 5/04; B60J 5/00
(52) U.S. Cl. ............................................ 49/502; 296/146.7
(58) Field of Search ............................ 49/502, 348, 352; 296/145.5, 146.7

(56) References Cited

U.S. PATENT DOCUMENTS

| | | | | |
|---|---|---|---|---|
| 3,782,036 | * | 1/1974 | Clark et al. .............................. | 49/502 |
| 4,662,115 | * | 5/1987 | Ohya et al. .............................. | 49/502 |
| 4,769,951 | * | 9/1988 | Kaaden ................................... | 49/502 |
| 4,882,842 | * | 11/1989 | Basson et al. ........................... | 29/857 |
| 4,914,863 | * | 4/1990 | Laukhuf ................................. | 49/502 |
| 4,945,682 | * | 8/1990 | Altman et al. ........................... | 49/502 |
| 5,040,334 | * | 8/1991 | Dossin et al. ............................ | 49/502 |
| 5,040,335 | * | 8/1991 | Grimes ................................... | 49/502 |
| 5,050,350 | * | 9/1991 | Bertolini et al. ........................ | 49/502 |
| 5,308,138 | | 5/1994 | Hlavaty . | |
| 5,482,343 | * | 1/1996 | Bradac ................................ | 296/39.1 |
| 5,715,630 | * | 2/1998 | Szerdahelyi et al. ................... | 49/351 |

FOREIGN PATENT DOCUMENTS

| | | | |
|---|---|---|---|
| 3928685 | 1/1991 | (DE) . | |
| 19526367 | 7/1995 | (DE) . | |
| 0286923 | 10/1988 | (EP) . | |
| 0336636 | 3/1989 | (EP) . | |
| 0427152 | 11/1990 | (EP) . | |
| 0694427 | 1/1996 | (EP) . | |
| 2626534 | 1/1988 | (FR) . | |
| 5984621 | * 5/1984 | (JP) ...................................... | 49/502 |
| 5984622 | * 5/1984 | (JP) ...................................... | 49/502 |
| 6130421 | * 2/1986 | (JP) ...................................... | 49/502 |
| 6130422 | * 2/1986 | (JP) ...................................... | 49/502 |
| 3114924 | * 5/1991 | (JP) ...................................... | 49/502 |
| 96283 | 9/1996 | (WO) . | |

* cited by examiner

*Primary Examiner*—Daniel P. Stodola
*Assistant Examiner*—Gregory J. Strimbu
(74) *Attorney, Agent, or Firm*—Carlson, Gaskey & Olds

(57) ABSTRACT

A door module (1) is adapted to be applied in a sealed manner to the periphery (2) of an inner opening (3) of a box structure (4) of a vehicle door (5) and can support devices such as a window raiser (6). The module (1) comprises a rigid peripheral part (14) composed of a first material having good mechanical properties shaped to be adaptable to the periphery (2) of the opening (3), and a plate (15) composed of a second material connected on its periphery in a sealed manner to the rigid peripheral part (14) and filling the area defined by the latter. The plate (15) may be composed of a cheap material, which reduces the cost of the module while maintaining its mechanical properties on the peripheral part thereof. The devices, in particular the window raiser, are fixed to the rigid peripheral part (14).

20 Claims, 1 Drawing Sheet

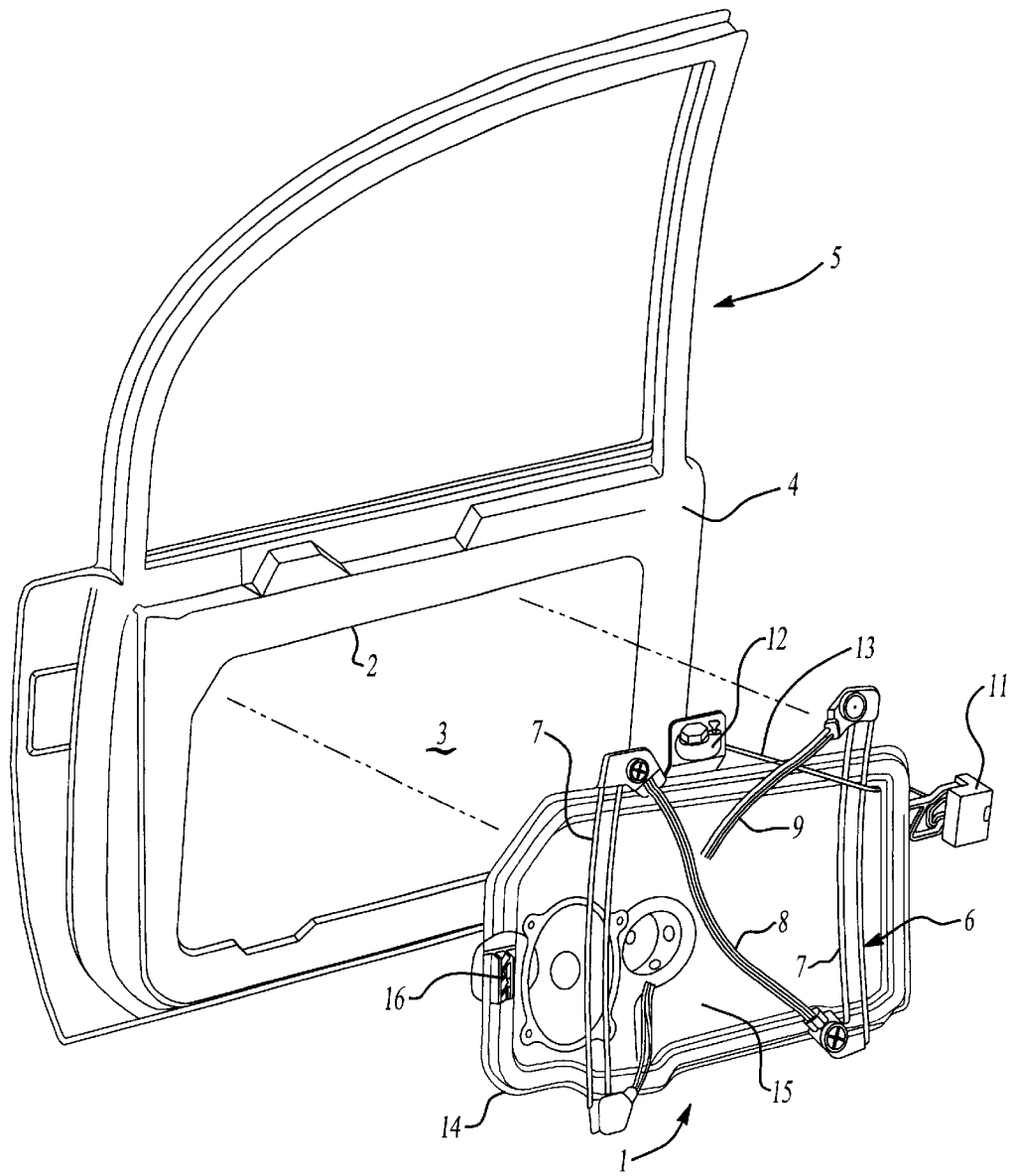

SEALED MODULE FOR A VEHICLE DOOR

BACKGROUND OF THE INVENTION

The present invention relates to an automobile vehicle door module adapted to be applicable in a sealed manner on the periphery of an inner opening of a box structure of the door, and provided with devices such as a window raiser, latch, internal latch opening handle, which are mounted on a suitably arranged panel.

BRIEF SUMMARY OF THE INVENTION

An object of the invention is to provide a module having a panel for carrying the devices that costs much less than the panels used up to the present time.

According to the invention, the door module comprises a rigid peripheral part composed of a first material, shaped to be adaptable to the periphery of the opening of the box structure in a sealed manner, and a plate composed of a second material connected on its periphery in a sealed manner to the rigid peripheral part and filling the area defined by the latter.

The material of the rigid peripheral part must have satisfactory mechanical properties to perform its function of a sealed support for the devices of the module. On the other hand, the material of the plate connected to the rigid peripheral part may be a cheap, low-quality material much less expensive than that of the rigid peripheral part, which enables substantially reducing the cost price of the panel making up the module.

In one embodiment of the invention, the rigid peripheral part is formed by a hollow section member or a section member including cross-bracing ribs.

The plate may be a film onto which the rigid peripheral part is molded.

Further features and advantages of the invention will be apparent from the following description, with reference to the accompanying drawing, which illustrates an embodiment of the invention by way of a non-limitative example.

BRIEF DESCRIPTION OF THE DRAWING

The FIGURE is an exploded perspective view of a vehicle door module according to the invention on the inner side of the door on the opening of which the module must be applied.

DETAILED DESCRIPTION OF THE PREFERRED EMBODIMENT

The module 1 illustrated in the single FIGURE is adapted to be applicable in a sealed manner on the periphery 2 of an inner opening 3 of a box structure 4 of a vehicle door 5.

This module 1 may be provided with devices such as a window raiser 6 which is, in the illustrated embodiment, of the so-called "double lift" type having two parallel rails 7 and guiding cables 8, 9 arranged in the form of an X between the rails. A latch 11 and an inner handle 12, for controlling the opening of the latch 11 through the medium of a rod 13, complete the devices. The devices are fixed to the rigid peripheral part 14, because of its mechanical properties, by known means which have not been shown.

The module 1 comprises a first rigid peripheral part 14 composed of a first material so shaped as to be adaptable to conform to the periphery 2 of the opening 3, and a plate 15 composed of a second material. The plate 15 is connected on its periphery in a sealed manner to the rigid, shaped peripheral part 14 and fills the area defined by the latter. In other words, the plate 15 essentially extends across the entire area framed by the first peripheral part 14.

The shaped peripheral part 14 is composed of a "high quality" material having good mechanical properties, such as for example a polyamide such as a 6—6 polyamide, a thermoset polyester or a thermosetting polyester polypropylene or a polyphenylene oxide including one with a glass fibre filler. The inner plate 15 preferably is a film onto which the rigid shaped peripheral part 14 is molded.

The peripheral part 14 may be formed by a hollow section member or may comprise cross-bracing ribs 16 (shown in the cut-away portion). The plate 15 may also be placed in position by injection-molding of a suitable material such as for example polypropylene, polyphenylene or a polyethylene, this process being well known and requiring no description. In the preferred embodiment, the peripheral part 14 and the plate 15 comprise a single continuous unitary structure.

The preceding description is exemplary rather than limiting in nature. Variations and modifications to the disclosed embodiment may become apparent to those skilled in the art, which do not depart from the essence and spirit of this invention. The scope of legal protection is only limited by the following claims.

What is claimed is:

1. A door module for use in sealing a periphery of an inner opening of a door structure, said module comprising:
   a rigid peripheral part composed of a first material and having a shape that is adapted to conform to the periphery of the inner opening of the door structure, said rigid peripheral part having an outer peripheral edge, and an inner peripheral edge defining an opening through said rigid peripheral part; and
   a plate made from a second material that is permanently secured to and sealingly engaging said rigid peripheral part adjacent the inner peripheral edge of the rigid peripheral part to thereby extend across the opening through said rigid peripheral part such that said plate and said ridge peripheral part form a monolithic structure.

2. The module according to claim 1, wherein said rigid peripheral part is at least partially hollow.

3. The module according to claim 1, wherein said rigid peripheral part includes cross-bracing ribs.

4. The module according to claim 1, wherein said peripheral part is molded onto said plate.

5. The module according to claim 1, wherein said second material is selected from the group of materials consisting of polypropylene and polyethylene.

6. The module according to claim 5, wherein said first material is selected from the group consisting of a 6—6 polyamide, a thermosetting polyester, and a polyphenylene oxide.

7. The module according to claim 6, wherein said first material includes a glass fiber filler.

8. The module according to claim 1, further comprising a window raiser, a latch and an inner latch-controlling handle supported on said peripheral part.

9. The module of claim 1, wherein said plate is injection molded into sealing engagement with said rigid peripheral part.

10. A vehicle door assembly, comprising:
    a door frame including an inner opening through a central portion of said door frame;
    a rigid frame member made from a first material having an outer peripheral edge and an inner peripheral edge defining an opening through said rigid frame member, said rigid frame member having a first face and a second face that faces in a direction opposite from said first face, said rigid frame member first face sealingly engaging said inner opening on said door frame adjacent said outer peripheral edge of said rigid frame member; and a plate member nonremovably fixed to and sealingly engaging said rigid frame member adjacent said frame member inner peripheral edge such that said plate member extends across said opening through said rigid frame member, said plate member being made from a second material that is different from said first material, said plate member and said frame member forming a monolithic structure.

11. The assembly of claim 10, wherein said frame member comprises cross-bracing ribs.

12. The assembly of claim 10, wherein said first material comprises one of the materials selected from the group consisting of polyamide, thermoset polyester and polyphenylene oxide.

13. The assembly of claim 12, wherein said first material includes a glass fiber filler.

14. The assembly of claim 10, wherein said rigid frame member is molded onto said plate member.

15. The assembly of claim 10, wherein said plate member is injected molded and supported by said frame member.

16. The assembly of claim 15, wherein said second material is selected from of the group consisting of polyphenylene and polyethylene.

17. The assembly of claim 10, including a plurality of mechanical components supported on said rigid frame member.

18. The assembly of claim 17, wherein said mechanical components include a window raiser, a latch and an inner latch-controlling handle.

19. The assembly of claim 7, wherein said plate member includes a first face facing in the same direction as said rigid frame member first face and a second face facing in the same direction as said rigid frame member second face and wherein said mechanical components are supported on said second face of said rigid frame member.

20. The assembly of claim 17, wherein said frame member is at least partially hollow.

* * * * *

UNITED STATES PATENT AND TRADEMARK OFFICE
CERTIFICATE OF CORRECTION

PATENT NO. : 6,233,875 B1
DATED : May 22, 2001
INVENTOR(S) : Carlo et al.

It is certified that error appears in the above-identified patent and that said Letters Patent is hereby corrected as shown below:

Column 4, claim 19,
Line 14, "claim 7" should be -- claim 17 --.

Signed and Sealed this

Eighth Day of January, 2002

Attest:

JAMES E. ROGAN

UNITED STATES PATENT AND TRADEMARK OFFICE
CERTIFICATE OF CORRECTION

PATENT NO.   : 6,233,875 B1
DATED        : May 22, 2001
INVENTOR(S)  : Carlo et al.

It is certified that error appears in the above-identified patent and that said Letters Patent is hereby corrected as shown below:

<u>Column 4, claim 19,</u>
Line 14, "claim 7" should be -- claim 17 --.

This certificate supersedes Certificate of Correction issued January 8, 2002

Signed and Sealed this

Fifth Day of February, 2002

Attest:

Attesting Officer

JAMES E. ROGAN
*Director of the United States Patent and Trademark Office*